(12) United States Patent
Heiselbetz et al.

(10) Patent No.: US 7,506,848 B2
(45) Date of Patent: Mar. 24, 2009

(54) CONNECTING DEVICE FOR ATTACHING A STRUCTURAL COMPONENT, A SHIELDING COMPONENT IN PARTICULAR

(75) Inventors: Gerald Heiselbetz, Langenzenn (DE); Fritz Goldmann, Cadolzburg (DE)

(73) Assignee: ElringKlinger AG, Dettingen/Erms (DE)

( * ) Notice: Subject to any disclaimer, the term of this patent is extended or adjusted under 35 U.S.C. 154(b) by 0 days.

(21) Appl. No.: 11/377,930

(22) Filed: Mar. 17, 2006

(65) Prior Publication Data
US 2006/0208141 A1    Sep. 21, 2006

(30) Foreign Application Priority Data
Mar. 19, 2005  (DE) .................. 10 2005 012 748

(51) Int. Cl.
*F16M 11/00* (2006.01)
*F16L 3/22* (2006.01)
(52) U.S. Cl. .................. 248/200; 248/68.1; 248/229.24
(58) Field of Classification Search .............. 248/68.1, 248/200, 67.5, 67.7, 74.4, 74.5, 74.1, 229.24
See application file for complete search history.

(56) References Cited

U.S. PATENT DOCUMENTS

| 1,307,240 | A | * | 6/1919 | Christopher | 403/217 |
| 3,584,348 | A | * | 6/1971 | Scoltysik | 248/68.1 |
| 4,707,051 | A | * | 11/1987 | Hall | 439/781 |
| H1012 | H | * | 1/1992 | Senatro | 248/68.1 |
| 5,172,877 | A | * | 12/1992 | Hattori et al. | 248/68.1 |
| 5,271,588 | A | * | 12/1993 | Doyle | 248/68.1 |
| 5,769,556 | A | * | 6/1998 | Colley | 403/24 |
| 6,883,761 | B2 | * | 4/2005 | Boon et al. | 248/74.1 |
| 6,902,138 | B2 | * | 6/2005 | Vantouroux | 248/68.1 |
| 7,179,010 | B2 | * | 2/2007 | Weger et al. | 403/289 |

FOREIGN PATENT DOCUMENTS

| DE | 1 800 278 | 11/1959 |
| DE | 68 06 388 | 11/1968 |

* cited by examiner

*Primary Examiner*—Anita M King
(74) *Attorney, Agent, or Firm*—Roylance, Abrams, Berdo & Goodman, L.L.P.

(57) ABSTRACT

In a connecting device, a structural component, a shielding component (1) in particular, is attached to at least one associated support part (9) by at least one clamping part (11). The clamping part, with at least one clamping surface (15), can be moved into contact with the support part (9). The clamping surface (15) is connected to an attachment arm (13) of the clamping part (11), and can be advanced non-positively onto the support part (9) by a feed (23, 27).

18 Claims, 2 Drawing Sheets ously constant high clamping force on the support parts remains even when at the clamping site, for example, by erosion, a loss of material is present, which would promote reduction of the clamping force.

CONNECTING DEVICE FOR ATTACHING A STRUCTURAL COMPONENT, A SHIELDING COMPONENT IN PARTICULAR

FIELD OF THE INVENTION

The present invention relates to a connecting device for attaching a structural component, a shielding component in particular, to at least one associated support part by at least one clamping part. The clamping part can be moved with at least one clamping surface into contact with the support part.

BACKGROUND OF THE PRESENT INVENTION

While the heat, such as that evolved by a high-economy, performance-optimized diesel engine, for example, can be very low on the cylinder crankshaft housing, this low heat does not apply to "hot zones" such as in manifolds, turbochargers, catalytic converters, etc. As a result of the increasingly compact design of engines, components which are not thermally "compatible" are coming to be in ever closer proximity. Hence, it is necessary to use shielding components such as heat shields to protect adjacent heat-sensitive assemblies, such as sensors, fuel lines, pressure cells, body parts, and so forth. The situation is also exacerbated by the compact structure in that the high packing density of the assemblies constricts the cooling air flow in the engine compartment. Noise abatement measures can also contribute to this problem. For example, under certain circumstances, plastic floor plates for reducing the level of sound emerging from the engine compartment to the Because of their high surface temperatures in some phases, catalytic converters are among the heat sources which may necessitate the use of protective shield barriers. A typical example is that of design measures, such as positioning the catalytic converter in the immediate vicinity of the manifold. This design principle, which performs the function of rapid heat-up of the catalytic converter, and thus of reducing emissions in the cold start phase, shifts a major source of heat into the engine compartment where a considerable number of assemblies are crowded in a tight space. Another reason for the growing importance of shielding components such as heat shields is the trend toward use of thermoplastics. Light and economical materials with their exceptional moldability are rapidly becoming common in the engine compartment, but require special attention with respect to ambient temperatures generated at the application site in connection with other heat-generating engine parts (New materials and Development Tools for Protection from Heat, in MTZ December 2001, Vol. 72, pp. 1044 et seq.).

In addition to the thermal loads to which structural components such as shielding components in particular are exposed in operation, there are mechanical loads, especially due to vibrations transmitted by the support parts to the structural components. In view of these loads, special demands must be imposed on the connecting devices which keep these structural components in position on the pertinent support parts. Conventional connecting devices of the prior art call for spring clamps with a certain pretensioning (clips) which are clamped by stud pins or the like, but also by entire components, for example, solenoid switches of generators, or by exhaust manifolds. The clamping force or holding force results from the choice of the spring material and the structural design of the pertinent springs. As has been found, however, especially when the pertinent structural component is a hot component, the danger exists that fatigue phenomena will occur in the spring material, and will occur to an increased degree when operation-induced vibrations are added. Reliable attachment of the pertinent structural components by the known connecting devices is therefore not ensured.

SUMMARY OF THE INVENTION

An object of the present invention is to provide a connecting device ensuring an especially secure attachment of structural components, even under high continuing thermal and mechanical loads.

This object is basically achieved by a connecting device with a non-positive advance of an attachment arm of the clamping part by a feed. The pertinent structural components are therefore clamped with a clamping force effected by the feed in addition to the forces of elasticity or independently of the forces of elasticity so that high operating reliability of attachment of the structural component is achieved.

In the prior art, only the spring force of the clamps or clips is available as the clamping force on the pertinent support part. As a result of the fatigue phenomena and vibration loads, the structural component may be displaced or even fall off.

Especially simple and reliable attachment arises in exemplary embodiments in which the feed has a locking screw. By the screwing force of the locking screw, the clamping part can be tensioned against the pertinent support part.

Preferably, for clamping two support parts located at a distance from each other, the clamping part has two attachment arms extending in directions opposite each other away from the feed shared by the two arms. In these embodiments, the attachment of the pertinent structural component is especially simple, since only one feed, for example, in the form of a locking screw, need be actuated to effect locking to several support parts. In many instances, it is sufficient for the overall mounting of the structural component if a single locking screw is tightened.

In especially advantageous embodiments, a mounting part connected to the structural component in the respective clamping region forms second or opposite clamping surfaces which interact with the pertinent clamping surfaces of the clamping part and against which the pertinent support parts can be pressed by the associated first clamping surfaces of the clamping part. The clamping part can be advanced in the direction to the mounting part by the screw force of the locking screw. If in this connection the configuration is such that when the clamping part is advanced in the direction to the mounting part, when the locking screw is being tightened the required clamping force desired for secure attachment is applied to the support parts tensioned between the clamping surfaces even before the clamping part is advanced by the locking screw up to contact with the mounting part. The resulting clamping force is then dependent on how closely the clamping part has approached the mounting part by tightening the locking screw. By more or less strong tightening of the locking screw, i.e., the clamping part more or less approaching the mounting part, the clamping force can be adjusted at will.

This embodiment also makes it possible to execute the clamping part as a comparatively rigid component, for example, in the form of a clamping strip with a reinforcing bead. The clamping force is determined here essentially solely according to the screw force of the locking screw.

When the required theoretical clamping force on the clamped support parts is achieved in the mounting process before the clamping part is advanced by the locking screw up to contact with the mounting part, a further advantage is that after a correspondingly long operating time has passed, if possibly service measures must be carried out, the locking screw can be retightened to move the clamping part closer to the mounting part. If after extended operating times, due to metal fatigue, for example, a certain relaxation of the clamping force should have occurred, the original desired clamping force can be restored by this retightening.

With respect to ease of mounting, it is especially advantageous if one of the arms of the clamping part is lengthened beyond the area of the pertinent clamping surface by an extension. This extension is connected to the mounting part at an attachment point. This arrangement yields a mounting unit in which in the premounted state the clamping part is already captively held on the associated structural component before the locking screw is attached to complete the mounting unit.

If in this connection the clamping part is designed as a stiff component, the extension between the attachment point and the transition area to the clamping surface of the adjacent arm has a spring element. The spring element permits essentially unhindered feed motion of the clamping part onto the support parts.

The subject matter of the present invention is also a structural component, a shielding component in particular, with a flat operating part and a mounting part connected to it. The mounting part is a component of a connecting device for attaching the structural component to at least one support part.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
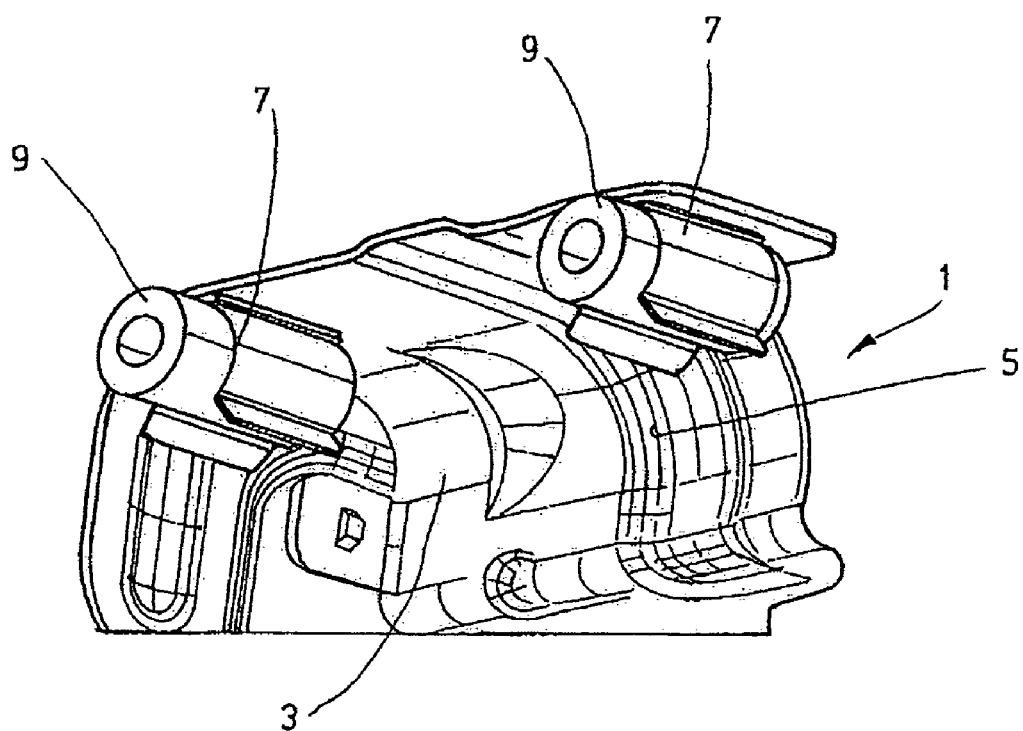
FIG. 1 is a perspective view, looking at the inside of a structural component in the form of a metallic shell part, forming a shielding component and provided with a connecting device according to the prior art for attaching the structural component to the support parts in the form of cylindrical sleeves.

FIG. 1 shows a structural component in the form of a shielding component 1. It has the shape of a partial metallic shell with an arched operating part 3, the interior of which is shown in FIG. 1. The structural component is intended as a heat shield or noise-insulating element for the shielding of the corresponding zones or components. The operating part 3 is provided with arched stiffening beads 5 which increase the dimensional stability for its attachment to the associated support parts, and has a connecting device according to the prior art which in the manner conventional in these known devices has clamps of spring steel or spring clips 7. The spring clips, due to their spring force with clamping surfaces located on the inside of their clamp legs, clamp the pertinent support parts, which are round sleeve bodies 9 in the illustrated example. The sleeve bodies 9 which form the support parts can be penetrated by stud bolts (not shown), for example, in conjunction with cylinder heads, engine blocks or exhaust manifolds of an internal combustion engine or can be connected in some other way to a supporting structure. Likewise the spring clips 7 could form a direct clamp connection on the stud bolts.

As already mentioned, in the designs according to the prior art shown in FIG. 1, the danger exists that relaxation of the force of elasticity of the clip 7 will occur due to fatigue phenomena and/or thermal loads in operation. Operating reliability then leaves something to be desired. The greatest attainable clamping force is limited at any rate to the spring force of the clips 7.

Figure 2:
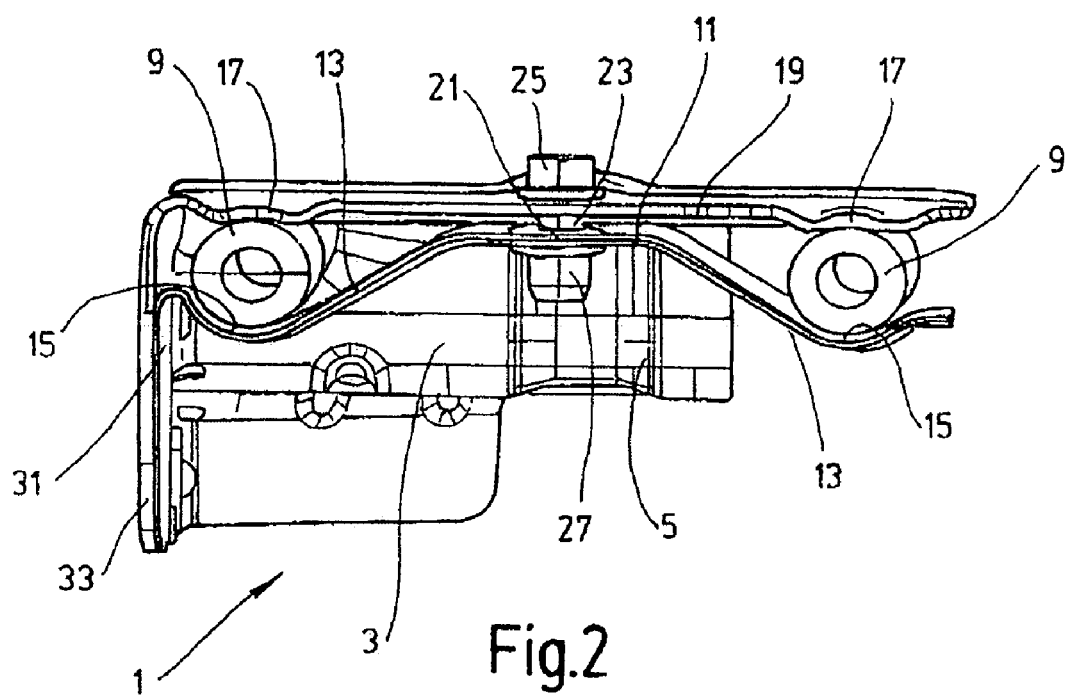
FIG. 2 is a perspective view, looking at the inside of a structural component in the form of a metallic shielding component in the form of a partial shell, according to an embodiment of a connecting device according to the present invention.
Figure 3:
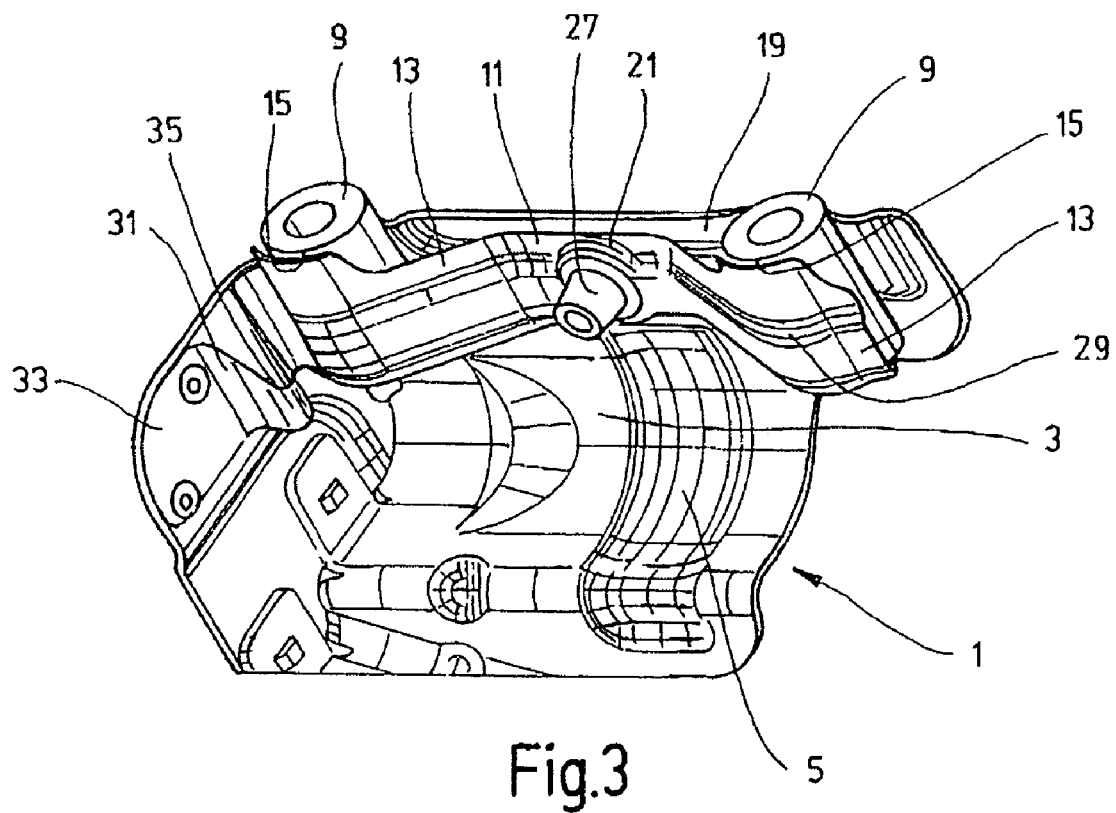
FIG. 3 is a perspective view of the structural component shown in FIG. 2.

FIGS. 2 and 3 show one embodiment of the connecting device according to the present invention for attaching a structural component, in the form of a shielding component 1 of the type shown in FIG. 1. As in FIG. 1, the shielding component 1 forms a flat operating part 3 forming the actual shield wall and having reinforcing beads 5 to increase the structural strength and to optimize the vibration behavior. This arrangement is also important with respect to noise insulation. As in the example of FIG. 1 corresponding to the prior art, the circular cylindrical sleeve bodies or sleeve parts 9 form the support parts to which the shielding component 1 can be attached and extend parallel to each other at a distance to each other.

Instead of using the spring clips 7 shown in FIG. 1, the present invention includes at least one clamping part 11 having an attachment arm 13 for each support part to be clamped, that is, here each sleeve body 9. Each attachment arm 13 is shaped such that in its end area it forms a first clamping surface 15 which surrounds a peripheral section of the respective sleeve body 9 to be clamped and presses that sleeve body against a second or opposite clamping surface 17 located on a mounting part 19. The mounting part 19 is connected to the operating part 3 of the shielding component 1, in the example shown here in the form of an edge strip integral with the operating part 3. This strip is essentially flat, except for the reinforcing bead extending along the edge strip and the arches forming the clamping surfaces 17. The main plane of the edge strip forming the mounting part 19 extends at a distance parallel to the connecting line between the cylinder axes of the cylindrical sleeve bodies 9 and parallel to these cylinder axes.

As shown in FIGS. 2 and 3, in the illustrated exemplary embodiment, the clamping part 11 has two arms so that two attachment arms 13 extend from a central area 21 in opposite directions toward the sleeve bodies 9 to be clamped. In the central area 21, a feed or feed means produces a feed movement of the attachment arms 13 against the sleeve bodies 9 to allow a clamping force to be created on them. In the illustrated embodiment, the feed means includes a locking screw configuration containing a locking screw 23 extending through the mounting part 19, and having a screw head 25 accessible on the outer side of the mounting part 19 and a rivet nut 27 riveted in the central area 21 of the clamping part 11 on one opening thereof.

As FIG. 2 clearly shows, when the locking screw 23 has been tightened to such an extent that on the clamping surfaces 15 and 17 the clamping force of the desired and necessary strength acts on the sleeve bodies 9, there is a distance between the clamping part 11 and the inside of the mounting part 19. This distance means that when the locking screw 23 is tightened more vigorously so that the distance between the central area 21 of the clamping part 11 and the mounting part 19 is reduced, the clamping force produced by the arms 13 by the clamping surface 15 is increased. When the clamping part 11 with the attachment arms 13 is made as a comparatively stiff component, for example, with a reinforcing bead 29 extending in the longitudinal direction (FIG. 3), the strength of the clamping force is essentially directly related to how strongly the locking screw 23 is tightened, i.e., how closely the clamping part 11 has approached the mounting part 19.

As shown in this example, the clamping part 11, on the end of its one attachment arm 13, is lengthened by an extension 31. The extension 31 is connected on the end side at an attachment point 33 to the edge part of the shielding component 1. This arrangement provides the advantage that when the connecting device is premounted on the shielding component 1, before the locking screw 23 is used, the clamping part 11 is already captively locked. Before the locking screw 23 engages the rivet nut 27 of the clamping part 11, the clamping part 11 can be raised relatively far off the mounting part 19. The insertion of the sleeve bodies 9 between the clamping surfaces 15 and 17 is then facilitated during mounting.

To prevent the feed motion produced by the locking screw 23 from being hindered in a comparatively rigid construction of the clamping part 11 in spite of attachment of the extension 31 to the attachment point 33, it is advantageous to provide a spring configuration 35 on the extension 31 between the attachment point 33 and the transition to the end of the attachment arm 13. The illustrated exemplary embodiment is a reduced-width point on the extension 31 which forms a shaft shape raised to the inside. This shaft acts both as a spring element to ensure comparatively free mobility of the facing attachment arm 13 of the clamping part 11, and also as a compensation element for possible thermally induced deformations, such as elongation and stretching. It is within the scope of the present invention to distribute the clamping force applied by the spring configuration 35 between the two sleeve bodies 9.

While one embodiment has been chosen to illustrate the invention, it will be understood by those skilled in the art that various changes and modifications can be made therein without departing from the scope of the invention as defined in the appended claims.

What is claimed is:

1. A shielding component, comprising:
   a first support part;
   an operating part;
   a clamping part having a first attachment arm with a first clamping surface movable relative to said support part into a position in which said first clamping surface contacts said first support part and having a comparatively stiff component;
   a feed coupled to said clamping part producing a feed force tensioning said clamping part against said first support part;
   an extension on a first end of said first attachment arm adjacent said first clamping surface, being connected to said operating part via an attachment point and having a spring element between said attachment point and a transition area extending to said first clamping surface, said spring element permitting movement of said comparatively stiff component relative to said first support part; and
   a mounting part coupled to said operating part and having a first opposite clamping surface against which said first support part is pressed when said first clamping surface is pressed in a direction of said mounting part against said first support part by said feed force of said feed.

2. A shielding component according to claim 1 wherein said feed comprises a locking screw producing a screw force tensioning said clamping part against said first support part.

3. A shielding component according to claim 1 wherein a second support part is spaced a distance from said first support part; and
   said clamping part comprises a second attachment arm extending in a direction opposite said first attachment arm having a second clamping surface contacting said second clamping part, said first and second attachment arms being joined by a central area of said clamping part, said feed being coupled to said central area.

4. A shielding component according to claim 3 wherein said first and second support parts comprise cylindrical bodies;
   said central area comprises a straight central part of said clamping part;
   said first and second attachment arms are curved and extend from said straight central part to define said clamping surfaces to conform to said cylindrical bodies; and
   said feed comprises a locking screw engaging said straight central part.

5. A shielding component according to claim 3 wherein said feed comprises a locking screw producing a screw force tensioning said clamping part against said first and second support parts.

6. A shielding component according to claim 5 wherein said mounting part has a second opposite clamping surface against which said second support part is pressed when said first and second clamping surfaces are pressed in a direction of said mounting part against said first and second support parts by said screw force of said locking screw.

7. A shielding component according to claim 1 wherein said extension is bent relative to said first attachment arm, and adjoins a correspondingly bent part of said mounting part.

8. A shielding component according to claim 1 wherein said operating part comprises a flat portion.

9. A shielding component according to claim 8 wherein said operating part and said mounting part are integral.

10. A shielding component according to claim 9 wherein said operating part comprises an arched shell part bordered on at least one end by said mounting part, said mounting part having a flat edge strip being bent relative to said shell part and being straight on a large part of a length thereof.

11. A shielding component, comprising:
    a first support part;
    an operating part having a flat portion and an arched shell part;
    a clamping part having a first attachment arm with a first clamping surface movable relative to said support part into a position in which said first clamping surface contacts said first support part;
    a feed coupled to said clamping part for advancing said clamping part against said first support part;
    an extension on a first end of said first attachment arm adjacent said first clamping surface, said extension being connected to said operating part via an attachment point; and
    a mounting part connected to and integral with said operating part and engaging said first support part, said arched shell part being bordered on at least one end by said mounting part, said mounting part having a flat edge strip being bent relative to said shell part and being straight on a large part of a length thereof.

12. A shielding component according to claim 11 wherein
said feed comprises a locking screw producing a screw force tensioning said clamping part against said first support part.

13. A shielding component according to claim 11 wherein
a second support part is spaced a distance from said first support part; and
said clamping part comprises a second attachment arm extending in a direction opposite said first attachment arm having a second clamping surface contacting said second clamping part, said first and second attachment arms being joined by a central area of said clamping part, said feed being coupled to said central area.

14. A shielding component according to claim 13 wherein
said first and second support parts comprise cylindrical bodies;
said central area comprises a straight central part of said clamping part;
said first and second attachment arms are curved and extend from said straight central part to define said clamping surfaces to conform to said cylindrical bodies; and
said feed comprises a locking screw engaging said straight central part.

15. A shielding component, comprising:
a first support part;
a second support part spaced a distance from said first support part;
an operating part;
a clamping part having a first attachment arm with a first clamping surface movable relative to said support part into a position in which said first clamping surface contacts said first support part, having a second attachment arm extending in a direction opposite said first attachment arm with a second clamping surface contacting said second clamping part and having a comparatively stiff component, said first and second attachment arms being joined by a central area of said clamping part;

a feed coupled to said central area of said clamping part providing a feed force tensioning said clamping part against said first support part;
an extension on a first end of said first attachment arm adjacent said first clamping surface, said extension being connected to said operating part via an attachment point and having a spring element between said attachment point and a transition area extending to said first clamping surface, said spring element permitting movement of said comparatively stiff component relative to said first support part; and
a mounting part coupled to said operating part and having first and second opposite clamping surfaces against which said first and second support parts are pressed when said first and second clamping surfaces are pressed in a direction of said mounting part against said first and second support parts by said feed force of said feed.

16. A shielding component according to claim 15 wherein
said feed comprises a locking screw producing a screw force tensioning said clamping part against said first and second support parts.

17. A shielding component according to claim 15 wherein
said extension is bent relative to said first attachment arm, and adjoins a correspondingly bent part of said mounting part.

18. A shielding component according to claim 15 wherein
said first and second support parts comprise cylindrical bodies;
said central area comprises a straight central part of said clamping part;
said first and second attachment arms are curved and extend from said straight central part to define said clamping surfaces to conform to said cylindrical bodies; and
said feed comprises a locking screw engaging said straight central part.

* * * * *